Patented June 8, 1954

2,680,751

UNITED STATES PATENT OFFICE 2,680,751

PREPARATION OF CYCLIC ANHYDRIDES OF AROMATIC DICARBOXYLIC ACIDS

William W. Prichard, Wilmington, Del., assignor to E. I. du Pont de Nemours and Company, Wilmington, Del., a corporation of Delaware No Drawing. Application September 25, 1951, Serial No. 248,274

11 Claims. (Cl. 260—346.7)

This invention relates to a new process of preparing cyclic anhydrides of aromatic dicarboxylic acids.

Aromatic dicarboxylic acid anhydrides are usually prepared by heating the free acid, alone or with a strong dehydrating agent such as phosphoric anhydride or acetyl chloride. Phthalic anhydride is conveniently prepared by vapor phase oxidation of naphthalene but this method is not a general one. Aromatic dicarboxylic acids are not satisfactory starting materials since they are in general difficultly accessible, and therefore uneconomical.

An object of the present invention is to provide a new and economical process of preparing cyclic anhydrides of aromatic dicarboxylic acids. A further object is to provide such a process involving an entirely new reaction whereby such anhydrides can be prepared in one step from readily available starting materials. Other objects will be apparent from the description of the invention given hereinafter.

The above objects are accomplished according to the present invention by reacting under substantially anhydrous conditions at a temperature of at least about 250° C. a monohalogenated aromatic compound having halogen attached directly to annular carbon of an aromatic ring, with carbon monoxide and a normal alkali metal salt of carbonic or phosphoric acid in the presence of nickel carbonyl as a catalyst.

In a more specific form, the process of the invention comprises reacting, preferably in an inert organic solvent, at a temperature of 250° C.–450° C. a monohalogenated aromatic compound of the formula R—X where R is an aromatic radical and X is a halogen of atomic number between 17 and 53 directly attached to annular carbon of an aromatic ring, with carbon monoxide and, in an amount corresponding to at least one atom of alkali metal per two moles of the aromatic compound, an alkali metal carbonate or trialkali metal phosphate in the presence of nickel carbonyl as a catalyst in an atmosphere of carbon monoxide.

It has been discovered that through the reaction above the aromatic dicarboxylic acid anhydride corresponding to the monohalogenated aromatic compound used, can be readily prepared in one step. The mechanism of the reaction is not known with certainty. It is believed that it proceeds through the following steps, taking chlorobenzene as the illustrative reactant:

1. Reaction of the monohalogenated aromatic compound with carbon monoxide to form the corresponding acid chloride:

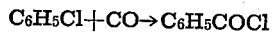

$C_6H_5Cl + CO \rightarrow C_6H_5COCl$

2. Condensation of the aromatic acid chloride with the normal alkali metal carbonate or phosphate, possibly through transitory formation of a mixed acid anhydride, to give the open chain monocarboxylic acid anhydride, in this case benzoic anhydride, and carbonic or phosphoric acid anhydride:

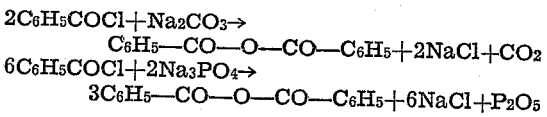

$2C_6H_5COCl + Na_2CO_3 \rightarrow$
   $C_6H_5-CO-O-CO-C_6H_5 + 2NaCl + CO_2$
$6C_6H_5COCl + 2Na_3PO_4 \rightarrow$
   $3C_6H_5-CO-O-CO-C_6H_5 + 6NaCl + P_2O_5$ 3. Rearrangement of the monocarboxylic acid anhydride to give one mole of dicarboxylic acid anhydride and one mole of the corresponding carbonyl-free aromatic nucleus, in this case phthalic anhydride and benzene:

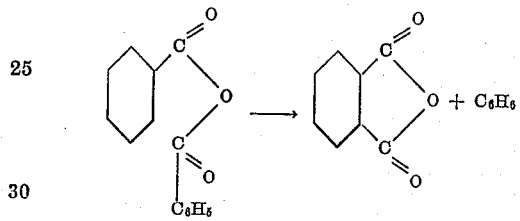

The above-described mechanism is supported in part by the fact that the monocarboxylic acid anhydride and the carbonyl-free aromatic compound can be isolated from the reaction product, together with the dicarboxylic acid anhydride, as shown in some of the examples below.

The reaction proceeds slowly at temperatures below about 250° C., and it is therefore preferred to operate above this temperature. The temperature can be as high as the decomposition point of the reactants, but in practice it need not be higher than about 450° C., a generally useful range being 250–375° C.

In view of the relatively high temperature necessary for the reaction to take place, it is conveniently carried out in pressure vessels in a carbon monoxide atmosphere. An added pressure of carbon monoxide is desirably used. This pressure is not critical, provided there is sufficient carbon monoxide present to react with the aromatic monohalide, and, preferably, an excess thereover. There can be used, for example, a carbon monoxide pressure between 10 and 1000 atmospheres at the operating temperature, a preferred range being 100 to 500 atmospheres at the reaction temperature.

The alkaline condensing agent is a normal salt (i. e., a salt in which all the hydrogen atoms of the acid have been replaced by an alkali metal) of carbonic or orthophosphoric acid. Thus, it can be lithium, sodium or potassium carbonate, or trilithium, trisodium or tripotassium phospate, or mixtures thereof. It is necessary to use normal salts, since it has been observed that acidic salts do not give the desired results. The salt used should be anhydrous, or substantially so. It should be used in an amount corresponding to at least one atom of alkali metal per two moles of aromatic monohalide. It has been found that if less than this quantity is used, the yields decrease more than expected, and become even negligible. Preferably, the amount of salt should correspond to at least one atom of alkali metal per mole of aromatic monohalide. Thus, there should be used, per mole of aromatic monohalide, at least one-fourth, and preferably one-half, mole of alkali metal carbonate or at least one-sixth, and preferably one-third, mole of trialkali metal phosphate. Amounts somewhat exceeding the stoichiometrical amounts can be used if desired, for example up to about 100% excess, but the use of a large excess of alkaline condensing agent decreases the yields. As is known, anhydrides are hydrolyzed by alkalis to give the salt of the corresponding acid. Consequently, an excess of alkali or reagent results in a portion of the anhydride being obtained as the acid salt.

Nickel carbonyl, Ni(CO)$_4$, is a specific catalyst for this reaction. It can be introduced in the reaction mixture as preformed nickel carbonyl, or it can be formed in situ from carbon monoxide and metallic nickel, or a nickel salt which forms nickel carbonyl, such as nickel chloride, nickel acetate, or nickel cyanide. The nickel carbonyl need be used only in small amounts, e. g., in amounts between 0.5% and 10% of metallic nickel based on the weight of the aromatic halide, although much more can be used if desired, e. g., up to 25% by weight or even more.

A solvent or diluent medium is not essential, but it is helpful to promote better contact between reactants and catalyst. Any inert organic solvent stable under the reaction conditions can be used, the preferred ones being the saturated aliphatic or alicyclic hydrocarbons such as n-hexane, kerosene, cyclohexane, and the like, and particularly the aromatic hydrocarbons such as benzene, toluene, the xylenes, naphthalene, and the like. As already noted, an aromatic compound having the nucleus of the starting aromatic halide is formed during the reaction. The amount of solvent in relation to reactants and catalyst is largely immaterial as long as there is sufficient solvent to provide good contact. For practical and economic reasons, there is usually employed from 1 to 20 parts of solvent or diluent per part of aromatic halide. Any solvent or diluent used should be anhydrous or substantially so as the reaction requires substantially anhydrous conditions.

At the preferred temperature the reaction is extremely rapid and sometimes vigorously exothermic. It is probably substantially completed almost instantaneously, but the heating period may be continued for a few hours if desired. The reaction product may be isolated by any method. In general, the solids present at the end of the reaction are, if desired, filtered off, the solvent or diluent, if any, and recovered nickel carbonyl are removed by distillation and the reaction product is fractionated and/or recrystallized.

The following examples in which parts are by weight unless otherwise stated illustrate specific embodiments of the invention.

*Example I*

A silver-lined pressure vessel having a volume equivalent to that of 400 parts of water was charged with 40 parts (0.25 mole) of bromobenzene, 80 parts of benzene, 15 parts (0.14 mole) of anhydrous sodium carbonate, and 8 parts of nickel carbonyl. The vessel was closed and the carbon monoxide was injected until the pressure in the system was 100 atmospheres. The vessel was then heated with agitation at 325° C. for two hours. The reaction product (123.5 parts) was heated in a still at 142° C., whereupon 78 parts of liquid distillate (benzene) was obtained at atmospheric pressure, then 0.5 part at 25 mm. pressure, and finally 7.7 parts of solid distillate at 0.1 mm. pressure. This was phthalic anhydride, M. P. 130° C. The still temperature was then raised to 255° C. and 3.8 parts of a mixture of phthalic and benzoic anhydrides distilled at 0.1 mm. pressure. This left 25.5 parts of a nearly white, solid distillation residue. This residue was dissolved in a small amount of water and treated with hydrochloric acid, whereupon 3.2 parts of phthalic acid, M. P. 230° C., was formed by neutralization of the monosodium phthalate present and precipitated. Recrystallization of the combined phthalic anhydride portions from benzene gave 11 parts of pure phthalic anhydride, M. P. 130–131° C. The total yield of phthalic anhydride, including that hydrolyzed to phthalic acid, was 73.3% of the calculated.

*Example II*

The pressure vessel of Example I was charged with 112 parts (1 mole) of chlorobenzene, 20 parts of nickel carbonyl, and 50.8 parts (0.31 mole) of substantially anhydrous trisodium phosphate, Na$_3$PO$_4$. The vessel was pressured to 100 atmospheres with carbon monoxide and heated with agitation at 325° C. The pressure in the system was then raised to 400 atmospheres by injection of carbon monoxide and the reaction mixture was maintained at this temperature and pressure for two hours, with intermittent repressuring with carbon monoxide to compensate for a pressure drop of 225 atmospheres. The reaction product (164 parts) gave the following four fractions on distillation:

1. Volatile below 142° C. at 25 mm. pressure, 41.5 parts liquid
2. Volatile below 142° C. at 0.1 mm. pressure, 17 parts solid
3. Volatile below 217° C. at 0.1 mm. pressure, 18.5 parts liquid and solid
4. Nonvolatile, 85 parts Fraction 1 gave on refractionation 11.5 parts of benzene (formed during the reaction) and 24.5 parts of unreacted chlorobenzene. Fraction 2, after washing with petroleum ether to remove traces of oily material, melted at 130–131° C. It was phthalic anhydride, further identified by mixed melting point with an authentic sample. Fraction 3 gave on refractionation 4 parts of phthalic anhydride and 14 parts of benzoic anhydride, M. P. 42° C. The latter was further identified by hydrolysis to benzoic acid and by its reaction with aniline to give benzanilide, M. P. 163° C.

Example III

The pressure vessel of Example I was charged with 80 parts (0.47 mole) of o-bromotoluene, 80 parts of benzene, 52 parts (0.32 mole) of anhydrous trisodium phosphate and 5 parts of nickel carbonyl. The vessel was pressured to 100 atmospheres with carbon monoxide, then heated with agitation at 325° C. for two hours. Distillation of the reaction product gave a low boiling fraction containing the benzene added as solvent and 6 parts of toluene formed during the reaction. There was then obtained 17.1 parts of 3-methylphthalic anhydride, M. P. 113–114° C., 2.5 parts of a mixture of 3-methylphthalic anhydride and o-toluic anhydride, and 6.5 parts of o-toluic anhydride. The latter was identified by its melting point, 38–39° C., and conversion to the anilide, M. P. 123° C.

Example IV

Example III was repeated with a mixture of 70 parts (0.43 mole) of alpha-chloronaphthalene, 80 parts of benzene, 23 parts (0.21 mole) of anhydrous sodium carbonate, and 5 parts of nickel carbonyl. After removal of the benzene from the reaction product there was obtained 10 parts of a while solid distillate which was identified as naphthalene, formed during the reaction. There was then obtained 12.5 parts of a very high boiling, orange, solid distillate. This was a mixture of alpha-naphthoic anhydride, identified by its melting point, 142–143° C., and of the anhydride of 1,8-dicarboxynaphthalene (naphthalic acid anhydride). The latter, which was insoluble in methanol, was recrystallized from a mixture of chloroform and methanol to give crystals melting at 272–275° C.

*Analysis.*—Calculated for $C_{12}H_6O_3$: C, 72.7%; H, 3.06%. Found: C, 72.76%; H, 3.10%.

Example V

Example III was repeated with a charge consisting of 112 parts (1 mole) of chlorobenzene, 69 parts (0.5 mole) of anhydrous potassium carbonate, and 2 parts of anhydrous nickel chloride. Distillation of the reaction product gave 11.5 parts of benzene, formed during the reaction; 12 parts of unreacted chlorobenzene; 14.5 parts of phthalic anhydride, and 11 parts of benzoic anhydride. The nonvolatile material was extracted with water and the extract was acidified with hydrochloric acid. This gave a precipitate of 23 parts of benzoic acid.

Example VI

A silver-lined pressure vessel was charged with 59.5 parts (0.255 mole) of p-bromodiphenyl, 120 parts of toluene, 13.5 parts (0.127 mole) of anhydrous sodium carbonate, and 20 parts of nickel carbonyl. The vessel was pressured to 100 atmospheres with carbon monoxide and heated with agitation at 275° C. for 5 hours. The reaction mixture was filtered to remove sodium bromide and a small amount of sodium salts of carboxylic acids. The solvent was removed by distillation at 142° C. at atmospheric pressure, then at 20 mm. pressure. At a pressure of 3 mm. and a temperature of 142° C. there was obtained 15 parts of diphenyl, formed during the reaction. Then at 3 mm. pressure and 255° C. there was obtained 18 parts of a light colored solid distillate, and there was left about 3 parts of a gummy, nonvolatile oil. The solid distillate after recrystallization from benzene yielded 10 parts of 4-phenylphthalic anhydride, M. P. 141–142° C., and further identified by mixed melting point with an authentic sample.

It will be understood that the above examples are merely illustrative and that the invention broadly comprises preparing cyclic anhydrides of aromatic dicarboxylic acids by reacting at a temperature of at least about 250° C. the selected monohalogenated aromatic compound with carbon monoxide and the requisite amount of alkali metal carbonate or phosphate to furnish at least one atom of alkali metal per two moles of the monohalogenated aromatic compound, in the presence of nickel carbonyl as a catalyst.

The process of this invention has been illustrated in the examples with reference to the treatment of certain monohalogenated aromatic compounds. It is generally applicable, however, to the preparation of aromatic dicarboxylic acid anhydrides from monohalogenated compounds of the formula R—X where R is an aromatic radical and X is a halogen of atomic number between 17 and 53 (chlorine, bromine, or iodine) directly attached to annular carbon of an aromatic ring. It is possible, of course, to use a mixture of two or more aromatic halides, in which case the reaction product consists of a mixture of two or more acid anhydrides.

The process of this invention is applicable, for example, to the treatment of aromatic monohalides in which the aromatic radicals are aryl groups of 1 to 3 six-membered nuclei, e. g., phenyl, naphthyl, anthryl or phenanthryl, including such aryl groups bearing substituents as alkyl, aryl, alkoxy, aryloxy, carbalkoxy, cyano, aldehyde groups, and the like. Obviously, it is undesirable to use starting materials containing functional groups reactive with either carbon monoxide or acid anhydrides under the reaction conditions, since side reactions would seriously decrease the yield of desired product in such instances. In general, these undesirable functional groups are those which evolve gas in the well-known Zerewitinoff test for active hydrogen, that is, those groups which contain an active hydrogen, namely, a hydrogen linked to an oxygen, nitrogen, or sulfur atom, and the nitro, nitroso, and azo groups. Likewise, it is obviously necessary that one of the ring carbons adjacent to the halogen-bearing ring carbon be unsubstituted, in order to permit the formation of a phthalic anhydride-type compound.

Additional specific examples of suitable starting materials are iodobenzene, 2-ethylbromobenzene, 4-n-hexylchlorobenzene, 2,3-dimethylchlorobenzene, 2,4,5 - trimethylbromobenzene, 2 - benzylchlorobenzene, beta-iodonaphthalene, 2-butyl-1-chloronaphthalene, 1 - bromoanthracene, 4-ethoxychlorobenzene, 4-phenoxychlorobenzene, 2-carbethoxybromobenzene, 4-cyanochlorobenzene, and the like. The preferred starting materials are the aromatic monohalides of the formula R—X where X is chlorine or bromine and R is an aryl group of 1 to 3 six-membered nuclei including such aryl groups substituted by alkyl radicals of 1 to 6 carbon atoms or by a phenyl group.

This invention provides a simple and effective method of preparing cyclic anhydrides of aromatic dicarboxylic acids from readily available starting materials. As is known, these products are of considerable technical importance as intermediates in the synthesis of many industrial products such as resins of the glyptal type, dyes, pharmaceuticals, and the like.

As many apparently widely different embodi-

The invention claimed is:

1. Process of preparing a cyclic anhydride of an aromatic dicarboxylic acid which comprises reacting under substantially anhydrous conditions at a temperature of at least about 250° C. a monohalogenated aromatic compound of the formula R—X where R is a carbocyclic aromatic radical of 1 to 3 six-membered nuclei free from functional groups which evolve gas in the Zerewitinoff test for active hydrogen, and X is a halogen of atomic number between 17 and 53 directly attached to annular carbon of an aromatic ring, said annular carbon being adjacent to an unsubstituted annular carbon of said aromatic ring, with carbon monoxide and, in an amount corresponding to at least one atom of alkali metal per two moles of said aromatic compound, a normal alkali metal salt of an acid from the group consisting of carbonic and phosphoric acids, in the presence of nickel carbonyl as a catalyst.

2. Process as set forth in claim 1 wherein said reaction is carried out under a carbon monoxide pressure of 10 to 1000 atmospheres.

3. Process as set forth in claim 2 wherein said reaction is carried out at a temperature of 250° C.–375° C.

4. Process as set forth in claim 3 wherein the amount of said alkali metal salt corresponds to at least one atom of alkali metal per mole of said aromatic compound.

5. Process of preparing a cyclic anhydride of an aromatic dicarboxylic acid which comprises reacting under substantially anhydrous conditions at a temperature of at least about 250° C. a monohalogenated aromatic compound of the formula R—X where R is a carbocyclic aromatic radical of 1 to 3 six-membered nuclei free from functional groups which evolve gas in the Zerewitinoff test for active hydrogen, and X is a halogen of atomic number between 17 and 53 directly attached to annular carbon of an aromatic ring, said annular carbon being adjacent to an unsubstituted annular carbon of said aromatic ring, with carbon monoxide and, in an amount corresponding to at least one atom of alkali metal per two moles of said aromatic compound, a normal alkali metal salt of an acid from the group consisting of carbonic and phosphoric acids, in the presence of nickel carbonyl as a catalyst and under a carbon monoxide pressure of 100 to 500 atmospheres.

6. Process as set forth in claim 5 wherein said reaction is carried out at a temperature of 250° C.–375° C.

7. Process as set forth in claim 6 wherein the amount of said alkali metal salt corresponds to at least one atom of alkali metal per mole of said aromatic compound.

8. Process as set forth in claim 7 wherein said alkali metal salt is a normal alkali metal carbonate.

9. Process as set forth in claim 7 wherein said alkali metal salt is a trialkali metal phosphate.

10. Process of preparing phthalic anhydride which comprises reacting under substantially anhydrous conditions at a temperature above about 250° C. chlorobenzene with carbon monoxide and, in an amount corresponding to at least one atom of alkali metal per two moles of said chlorobenzene, a normal alkali salt of an acid from the group consisting of carbonic and phosphoric acids, in the presence of nickel carbonyl as a catalyst.

11. Process of preparing phthalic anhydride which comprises reacting under substantially anhydrous conditions in an inert organic solvent at a temperature of 250° C.–375° C. chlorobenzene with carbon monoxide and, in an amount corresponding to at least one atom of alkali metal per mole of said chlorobenzene, a normal alkali salt of an acid from the group consisting of carbonic and phosphoric acids, in the presence of nickel carbonyl as a catalyst and under a carbon monoxide pressure of 100 to 500 atmospheres.

References Cited in the file of this patent

UNITED STATES PATENTS

| Number | Name | Date |
|---|---|---|
| 2,060,195 | Goldschmidt et al. | Nov. 10, 1936 |
| 2,087,030 | Gray | July 13, 1937 |

OTHER REFERENCES

Richter, "Textbook of Org. Chem." (1938), page 162.